(12) United States Patent
Jacobs et al.

(10) Patent No.: US 9,727,357 B2
(45) Date of Patent: *Aug. 8, 2017

(54) FAILOVER DETECTION AND TREATMENT IN CHECKPOINT SYSTEMS

(71) Applicant: International Business Machines Corporation, Armonk, NY (US)

(72) Inventors: Stuart Z. Jacobs, Lakeville, MN (US); David A. Larson, Rochester, MN (US); Kyle A. Lucke, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 14/043,244

(22) Filed: Oct. 1, 2013

(65) Prior Publication Data

US 2015/0095907 A1   Apr. 2, 2015

(51) Int. Cl.
| | | |
|---|---|---|
| *G06F 9/455* | (2006.01) | |
| *G06F 11/14* | (2006.01) | |
| *G06F 11/07* | (2006.01) | |
| *G06F 9/48* | (2006.01) | |

(52) U.S. Cl.
CPC ...... *G06F 9/45533* (2013.01); *G06F 9/45558* (2013.01); *G06F 11/14* (2013.01); *G06F 9/4856* (2013.01); *G06F 11/0712* (2013.01); *G06F 2009/45591* (2013.01)

(58) Field of Classification Search
CPC ...... G06F 9/52; G06F 9/5077; G06F 9/45533; G06F 9/4862; G06F 11/203; G06F 11/2007
See application file for complete search history.

(56) References Cited

U.S. PATENT DOCUMENTS

| | | | |
|---|---|---|---|
| 5,778,388 A | 7/1998 | Kawamura et al. | |
| 6,189,112 B1 | 2/2001 | Slegel et al. | |
| 6,542,926 B2 | 4/2003 | Zalewski et al. | |
| 6,622,263 B1 | 9/2003 | Stiffler et al. | |
| 6,892,383 B1 * | 5/2005 | Arndt | G06F 9/5077 711/203 |
| 7,434,087 B1 * | 10/2008 | Singh | G06F 11/1443 714/4.11 |

(Continued)

OTHER PUBLICATIONS

Bailey et al., "IBM PowerVM Live Partition Mobility", IBM RedBooks, International Technical Support Organization, Mar. 2009, Second Edition, © Copyright International Business Machines Corporation 2007, 2009.

(Continued)

*Primary Examiner* — Lewis A Bullock, Jr.
*Assistant Examiner* — Gilles Kepnang
(74) *Attorney, Agent, or Firm* — Robert J. Shatto (57) ABSTRACT

A method for treatment of a hypervisor call sequence, in a system having a plurality of hosts, includes assigning a host ID to a plurality of hosts in the system; identifying a first host ID for a host from which a first hypervisor call of a hypervisor call sequence originates; identifying a second host ID for a host from which a second hypervisor call of the hypervisor call sequence originates, wherein the second hypervisor call is a call subsequent to the first hypervisor call; and determining whether the second host ID is equal to the first host ID.

7 Claims, 4 Drawing Sheets

(56) References Cited

U.S. PATENT DOCUMENTS

| | | | |
|---|---|---|---|
| 7,840,768 B2 | 11/2010 | Stiffler et al. | |
| 8,381,033 B2* | 2/2013 | Franklin | G06F 11/0712 714/25 |
| 8,402,462 B2* | 3/2013 | Ciano | G06F 9/4862 718/1 |
| 8,812,907 B1* | 8/2014 | Bissett | G06F 11/1484 714/20 |
| 8,826,273 B1* | 9/2014 | Chen | 718/1 |
| 8,910,160 B1* | 12/2014 | Patwardhan | G06F 9/4856 718/1 |
| 9,032,241 B2* | 5/2015 | Nagasawa | 714/4.11 |
| 9,032,248 B1* | 5/2015 | Petty | G06F 11/2038 714/11 |
| 2005/0132379 A1* | 6/2005 | Sankaran | G06F 9/4856 718/105 |
| 2005/0289553 A1* | 12/2005 | Miki | G06F 11/2007 718/104 |
| 2007/0174361 A1* | 7/2007 | Branda | G06F 9/4856 |
| 2008/0104586 A1* | 5/2008 | Thorton | G06F 9/45533 718/1 |
| 2008/0162983 A1* | 7/2008 | Baba | G06F 11/0712 714/3 |
| 2008/0189468 A1* | 8/2008 | Schmidt | G06F 11/203 711/6 |
| 2008/0263390 A1* | 10/2008 | Baba | G06F 11/1484 714/4.1 |
| 2009/0025007 A1* | 1/2009 | Hara | G06F 3/0607 718/105 |
| 2009/0037672 A1* | 2/2009 | Colbert | G06F 9/4856 711/154 |
| 2009/0083735 A1* | 3/2009 | Kimura | 718/1 |
| 2009/0183173 A1* | 7/2009 | Becker | G06F 9/45533 719/313 |
| 2009/0217083 A1* | 8/2009 | Hatasaki | G06F 11/2025 714/4.1 |
| 2009/0222815 A1* | 9/2009 | Dake | G06F 9/455 718/1 |
| 2009/0276772 A1* | 11/2009 | Garrett | G06F 9/455 718/1 |
| 2010/0037096 A1 | 2/2010 | Bum et al. | |
| 2010/0318838 A1* | 12/2010 | Katano | G06F 11/0712 714/4.1 |
| 2011/0173608 A1* | 7/2011 | Buragohain | G06F 9/45558 718/1 |
| 2011/0238792 A1* | 9/2011 | Phillips | G06F 15/177 709/220 |
| 2012/0047501 A1* | 2/2012 | Box et al. | 718/1 |
| 2012/0110181 A1* | 5/2012 | Tsirkin | G06F 9/4856 709/226 |
| 2012/0159235 A1* | 6/2012 | Suganthi | G06F 11/2028 714/4.11 |
| 2012/0233499 A1* | 9/2012 | Estaves | G06F 9/45533 714/23 |
| 2012/0278801 A1* | 11/2012 | Nelson | G06F 9/45533 718/1 |
| 2012/0278804 A1* | 11/2012 | Narayanasamy | G06F 9/45558 718/1 |
| 2012/0291027 A1* | 11/2012 | Chiang | G06F 9/5077 718/1 |
| 2012/0304169 A1 | 11/2012 | Anderson et al. | |
| 2012/0311576 A1* | 12/2012 | Shu | G06F 9/45558 718/1 |
| 2012/0324452 A1* | 12/2012 | Kimura | G06F 9/52 718/1 |
| 2013/0036323 A1* | 2/2013 | Goose | G06F 11/1484 714/4.11 |
| 2013/0054889 A1* | 2/2013 | Vaghani | G06F 3/0604 711/114 |
| 2013/0067470 A1 | 3/2013 | Chen et al. | |
| 2013/0125122 A1* | 5/2013 | Hansen | 718/1 |
| 2013/0132946 A1* | 5/2013 | Ma | 718/1 |
| 2013/0198739 A1* | 8/2013 | Razdan | G06F 9/45558 718/1 |
| 2013/0263114 A1* | 10/2013 | Watkins | G06F 9/45558 718/1 |
| 2013/0282887 A1* | 10/2013 | Terayama | G06F 9/45533 709/223 |
| 2014/0013324 A1* | 1/2014 | Zhang | H04L 49/70 718/1 |
| 2014/0059312 A1* | 2/2014 | Uno | G06F 3/0655 711/162 |
| 2014/0229933 A1* | 8/2014 | Kanungo | G06F 9/45558 718/1 |
| 2014/0244938 A1* | 8/2014 | Cota-Robles | G06F 3/0611 711/137 |
| 2015/0007170 A1* | 1/2015 | Tsirkin | G06F 9/45533 718/1 |
| 2015/0032836 A1* | 1/2015 | Venkatesan | G06F 9/4856 709/212 |
| 2015/0082302 A1* | 3/2015 | Cheng et al. | 718/1 |
| 2015/0095908 A1 | 4/2015 | Jacobs et al. | |
| 2015/0205650 A1* | 7/2015 | Shimada | G06F 11/004 714/703 |

OTHER PUBLICATIONS

Bowen et al., "Virtual Checkpoints: Architecture and Performance", IEEE Transactions on Computers, vol. 41, Issue 5, pp. 516-525, 1992, (Manuscript received Jun. 24, 1991, Revised Dec. 4, 1991), © 1992 IEEE. DOI: 10.1109/12.142677.

Cabillic et al., "The Performance of Consistent Checkpointing in Distributed Shared Memory Systems", Proceedings: 14th Symposium on Reliable Distributed Systems, 1995, pp. 96-105, © 1995 IEEE. DOI: 10.1109/RELDIS.1995.526217.

Elnozahy et al., "The Performance of Consistent Checkpointing", Proceedings: 11th Symposium on Reliable Distributed Systems, 1992, pp. 39-47, © 1992 IEEE. DOI: 10.1109\RELDIS.1992.235144.

Elnozahy et al., "A Survey of Rollback-Recovery Protocols in Message-Passing Systems", ACM Computing Surveys (CSUR), vol. 34, Issue 3, Sep. 2002, pp. 375-408, ACM New York, NY. DOI: 10.1145/568522.56825.

IBM, "z/VM Single System Image Overview", © 2013 IBM Corporation. http://www.vm.ibm.com/ssi.

Jacobs, S., et al., "Checkpoint Capture and Tracking in a High Availability System," U.S. Appl. No. 14/027,795, filed Aug. 16, 2013.

Kingsley et al., "Compiler-Assisted Checkpoint Optimization Using SUIF", Paper Submitted to First SUIF Compiler Workshop, Nov. 15, 1995, pp. 1-16. DOI: 10.1.1.31.1300.

Larson, D., "Virtual Machine Suspension in Checkpoint System," U.S. Appl. No. 14/026,533, filed Sep. 13, 2013.

Li et al., "Real-Time, Concurrent Checkpoint for Parallel Programs", PPOPP '90: Proceedings of the second ACM SIGPLAN symposium on principles & practice of parallel programming, Feb. 1990, pp. 79-88, ACM New York, NY © 1990. DOI: 10.1145/99163.99173.

Plank et al, "Libckpt: Transparent Checkpointing Under Unix", TCON '95: Proceedings of the USENIX Winter 1995 Technical Conference Proceedings, Jan. 1995.

Plank et al., "Diskless Checkpointing", Technical Report UT-CS-97-380, University of Tennessee, Dec. 17, 1997, pp. 1-30.

Red Hat, "Virtualization Administration Guide, Chapter 4: KVM live migration", Red Hat Customer Portal, © 2012 Red Hat, Inc. https://access.redhat.com/knowledge/docs/en-US/Red_Hat_Enterprise_Linux/6/html/Virtualization_Administration_Guide/.

Wilson et al., "Demonic Memory for Process Histories", PLDI '89: Proceedings of the ACM SIGPLAN 1989 Conference on Programming language and design and implementation, Jul. 1989, pp. 330-343, ACM New York, NY ©1989. DOI: 10.1145/73141.74898.

* cited by examiner

FAILOVER DETECTION AND TREATMENT IN CHECKPOINT SYSTEMS

TECHNICAL FIELD

This disclosure relates to checkpoint systems. In particular, it relates to a hypervisor interface system for detection and treatment of a host failover.

BACKGROUND

Virtualization involves creation of an abstracted system on a hardware platform. A hypervisor creates one or more virtual machines on a computer system and manages resource, memory, and device allocation for the virtual machines. The hypervisor may be installed directly on the hardware or may be installed on a host operating system. Each virtual machine has abstracted components such as a processor, memory, and I/O devices, as well as an installed guest operating system.

Virtual machines often perform parallel tasks and are managed with regard to the tasks. A virtual machine may fail due to hardware failure, firmware failure, power loss, or other casualty that interrupts operation of the virtualized system. High availability is the concept of maintaining service of virtual components in the event of such a failure.

SUMMARY

The present disclosure includes a method for treatment of a hypervisor call sequence having a plurality of hypervisor calls, in a system having a plurality of hosts, that includes: assigning a host identity (ID) to a plurality of hosts in a system; retrieving a first host ID for a host from which a first hypervisor call of a hypervisor call sequence originates; receiving a second hypervisor call of the hypervisor call sequence from the virtual machine, wherein the second hypervisor call is a call subsequent to the first hypervisor call; retrieving a second host ID identifying the host from which the second hypervisor call originates; and determining whether the second host ID is equal to the first host ID.

The present disclosure includes a computer system for treatment of a hypervisor call sequence having a plurality of hypervisor calls, in a system having a plurality of hosts, comprising one or more processor circuits configured and arranged to: assign a host identity (ID) to a plurality of hosts in a system; identify a first host ID for a host from which a first hypervisor call of a hypervisor call sequence originates; identify a second host ID for the host from which a second hypervisor call of the hypervisor call sequence originates, wherein the second hypervisor call is a call subsequent to the first hypervisor call; and determine whether the second host ID is equal to the first host ID.

The present disclosure includes a computer readable storage medium for treatment of a hypervisor call sequence having a plurality of hypervisor calls, in a system having a plurality of hosts, the computer readable storage medium having instructions stored thereon which, when executed, cause a processor to perform the following operations: assign a host ID to a plurality of hosts in a system; identify a first host ID for a host from which a first hypervisor call of a hypervisor call sequence originates; identify a second host ID for a host from which a second hypervisor call of the hypervisor call sequence originates, wherein the second hypervisor call is a call subsequent to the first hypervisor call; and determine whether the second host ID is equal to the first host ID.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of embodiments of the invention and do not limit the invention.

DETAILED DESCRIPTION

Aspects of the present disclosure relate to checkpoint systems, while more particular aspects relate to a hypervisor interface system for detection and treatment of a host failover. While the present invention is not necessarily limited to such applications, various aspects of the invention may be appreciated through a discussion of various examples using this context.

Consistent with embodiments of the present disclosure, a virtual machine can send a request for information or actions through a hypervisor call. During a hypervisor call, the virtual machine communicates with a hypervisor through a hypervisor interface. When the virtual machine makes the hypervisor call, the hypervisor interface sets up the environmental parameters and conditions for the call, collects various inputs and pieces of data, makes the call to the hypervisor, and decodes the result from the hypervisor for an operating system executed by the virtual machine. The hypervisor interface may act as a procedural translator, and other hypervisor interfaces may be added between the operating system and the existing hypervisor interface.

A single hypervisor call may involve a single action, such as a simple operation. For a virtual machine to perform more complex actions, the virtual machine may perform a sequence of simple hypervisor calls. Each hypervisor call within the sequence of hypervisor calls can perform an independent action. The hypervisor call sequence may have a starting index and call counter to track the hypervisor calls within the hypervisor call sequence.

In the event of failure of a primary host system operating one or more programs, the virtual machine may migrate to a mirrored secondary host through a process known as live migration, or failover. If a hypervisor call sequence is underway by the virtual machine when failover occurs, a portion of the hypervisor call sequence may be performed on the primary host and a portion of the hypervisor call sequence may be performed on the secondary host. Consuming data from multiple systems during hypervisor calls or performing actions on the wrong system due to failover may lead to unintended consequences. For example, hosts may often exist in different configurations, and a hypervisor call intended for a host with a certain configuration may not be performed correctly when the system migrates to another host.

According to embodiments of the disclosure, a hypervisor call sequence may be evaluated by a host ID hypervisor interface to determine whether a failover has occurred in a high availability system. The host ID hypervisor interface may maintain host IDs for hosts in the system and determine the host from which a hypervisor call or hypervisor call sequence has been sent. The system may determine that a failover has occurred by detecting that more than one host has executed hypervisor calls in the hypervisor call sequence.

Figure 1:
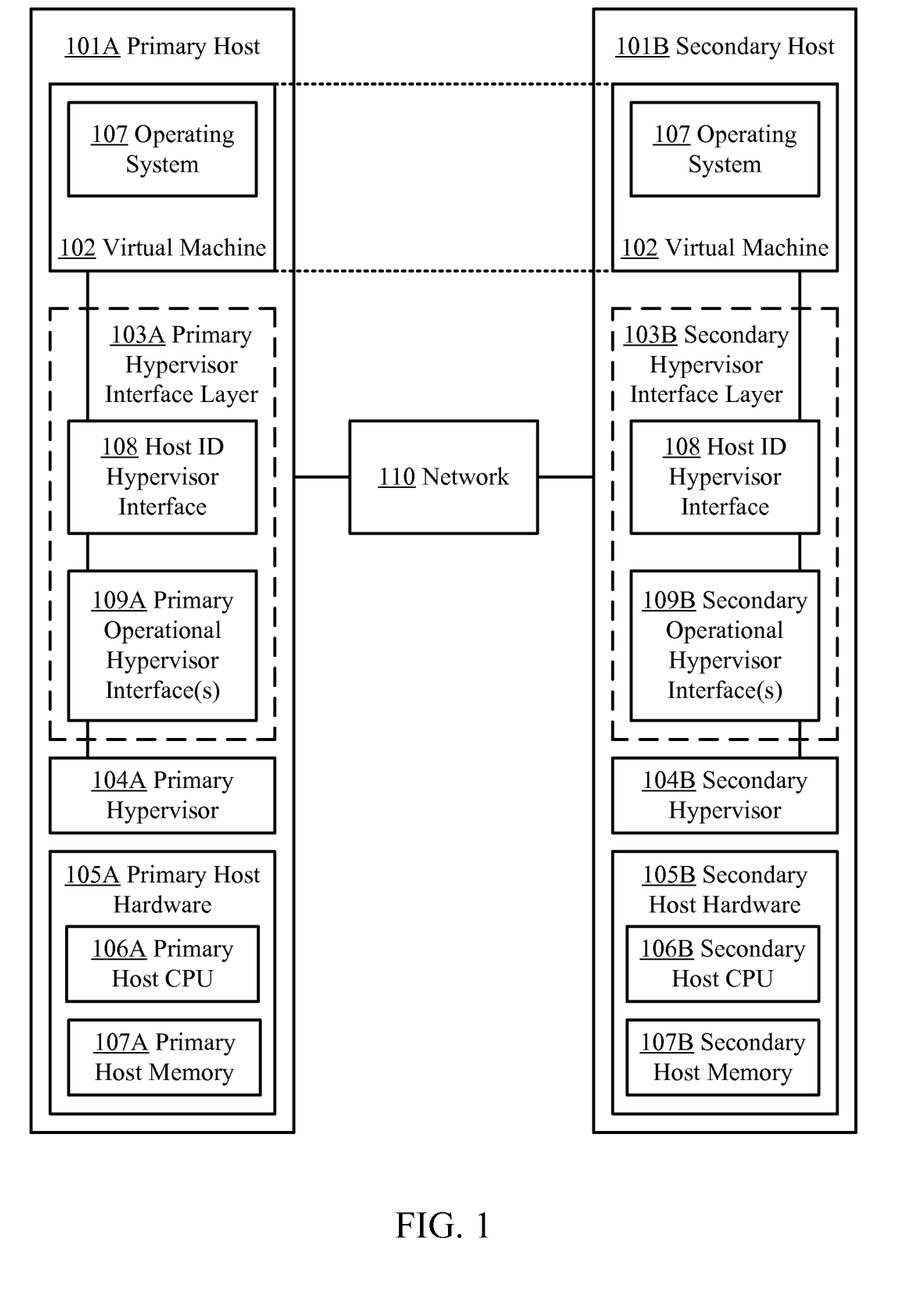
FIG. 1 is a diagram of a change in host ID without and with failover, according to embodiments of the disclosure.

FIG. 1 is a diagram of a system having a virtual machine in communication with a hypervisor through an intermediate hypervisor interface layer, according to embodiments of the disclosure. For purposes of FIG. 1, each primary (A) and secondary (B) component may be referred to collectively by its figure number as being functionally similar, though different configurations for each component will often exist. The system may contain two or more hosts 101 (a primary host 101A and a secondary host 101B shown here) connected by a network 110 and abstracting a virtual machine 102 having an operating system 107. Each host 101 may host a respective instance of virtual machine 102, one of which may be the active instance and the other of which may be the failover or redundant instance. The virtual machine 102 may include an operating system 107. Each host may contain a hypervisor 104 and host hardware 105. The host hardware 105 may include a host CPU 106 and host memory 107. The respective instances of the virtual machine 102 on different hosts 101 may be functionally and/or logically the same.

The virtual machine 102 abstracted on each host 101 may be in communication with a hypervisor 104 through a hypervisor interface layer 103. The hypervisor interface layer 103 may include a host ID hypervisor interface 108 and operational hypervisor interfaces 109. The host ID hypervisor interface 108 may be used for tracking the execution instance of the host. The operational hypervisor interfaces 109 may be used for collecting data, performing privileged functions, and other procedural and informational tasks. The hypervisor interface layer 103 may have more than one operational hypervisor interface 109. For example, if a system has multiple underlying architectures or hypervisors, a hypervisor call may be made to multiple operational hypervisor interfaces 109. The operational hypervisor interfaces 109 may be any hypervisor interface used for procedural or informational purposes.

The host ID hypervisor interface 108 may communicate between the virtual machine 102 and the operational hypervisor interface 109 involved with hypervisor calls. The host ID hypervisor interface 108 may be a computer implementation that receives inputs intended for the operational hypervisor interfaces 109 and outputs intended for the virtual machine 102. The host ID hypervisor interface 103 may have logic for maintaining a host ID for each host 101 in the system and, when queried by or receiving a hypervisor call or call sequence from the virtual machine 102, determining the host 101 currently executing the virtual machine 102.

For example, the virtual machine 102 may perform a first hypervisor call of a hypervisor call sequence on the primary host 101A. Without a host ID hypervisor interface 108, the first hypervisor call would pass to the primary operational hypervisor interface 109A. If a failover occurred during the sequence, the virtual machine 102 may migrate to the secondary host 101B, making the corresponding instance of the virtual machine 102 on the secondary host 101B the active instance. When the virtual machine 102 performs a second hypervisor call in the sequence, the second hypervisor call will again pass through to the secondary operational hypervisor interface 109B. If the hypervisor call sequence were to continue to be performed on different machines, inconsistent or sub-optimal results may occur.

Continuing with the example, with a host ID hypervisor interface 108, the first hypervisor call may pass to the host ID hypervisor interface 108 before passing to the primary operational hypervisor interface 109A. The host ID hypervisor interface 108 may determine a first host ID indicating the primary host 101A from which the virtual machine 102 initiated the first hypervisor call. If a failover occurred during the sequence, the virtual machine 102 may still migrate to the secondary host 101B. Now, however, when the second hypervisor call is performed by the virtual machine 102 (now executing on the secondary host 101B), the host ID hypervisor interface 108 may determine a second host ID indicating the secondary host 101B from which the virtual machine 102 sent the second hypervisor call. The system may then recognize that the first and second hypervisor calls were sent from different hosts 101, and handle the failover, such as by restarting the hypervisor call sequence on the secondary host 101B.

The hosts 101 may be data processing systems with processors, memory, and input/output resources, such as servers. The system configuration of the hosts 101 may be similar, even while their operation in the system is functionally different. The hosts 101 may be physically configured according to their failover conditions, and often a primary and secondary host 101 will be physically and electrically separated for a loss of power failover condition. For systems requiring more robust high availability, more than one secondary host 101B may be part of the system. While the primary and secondary hosts 101 may be described in terms of specific functions, they may be configured to perform the functions of the other due to their failover function.

Each host 101 may have a hypervisor 104 (or virtual machine manager) installed as firmware or software. The hypervisor 104 may be installed directly on the hardware (type 1 hypervisor), such as on firmware or system memory, or may be installed on an operating system (type 2 hypervisor). The hypervisor 104 controls, manages the interactions between, and allocates physical resources to the virtual machine 102 abstracted on to its host machine 101.

The primary and secondary hypervisors 104 of the primary and secondary hosts 101 may abstract a virtual machine 102 onto the hardware of their respective hosts 101. A virtual machine 102 is a software or hardware implementation of a physical machine that may execute instructions like a physical machine. A virtual machine 102 abstracted onto the primary host 101A by a primary hypervisor 104A may execute instructions and consume processor resources running applications. The virtual machine 102 abstracted onto the secondary host 101B by a secondary hypervisor 104B may receive state and memory page updates through checkpoints, but may not execute instructions until a failover has occurred and control has transferred to the secondary host 101B. Hardware implementations of virtual machines may include logical partitions of hardware resources.

Figure 2:
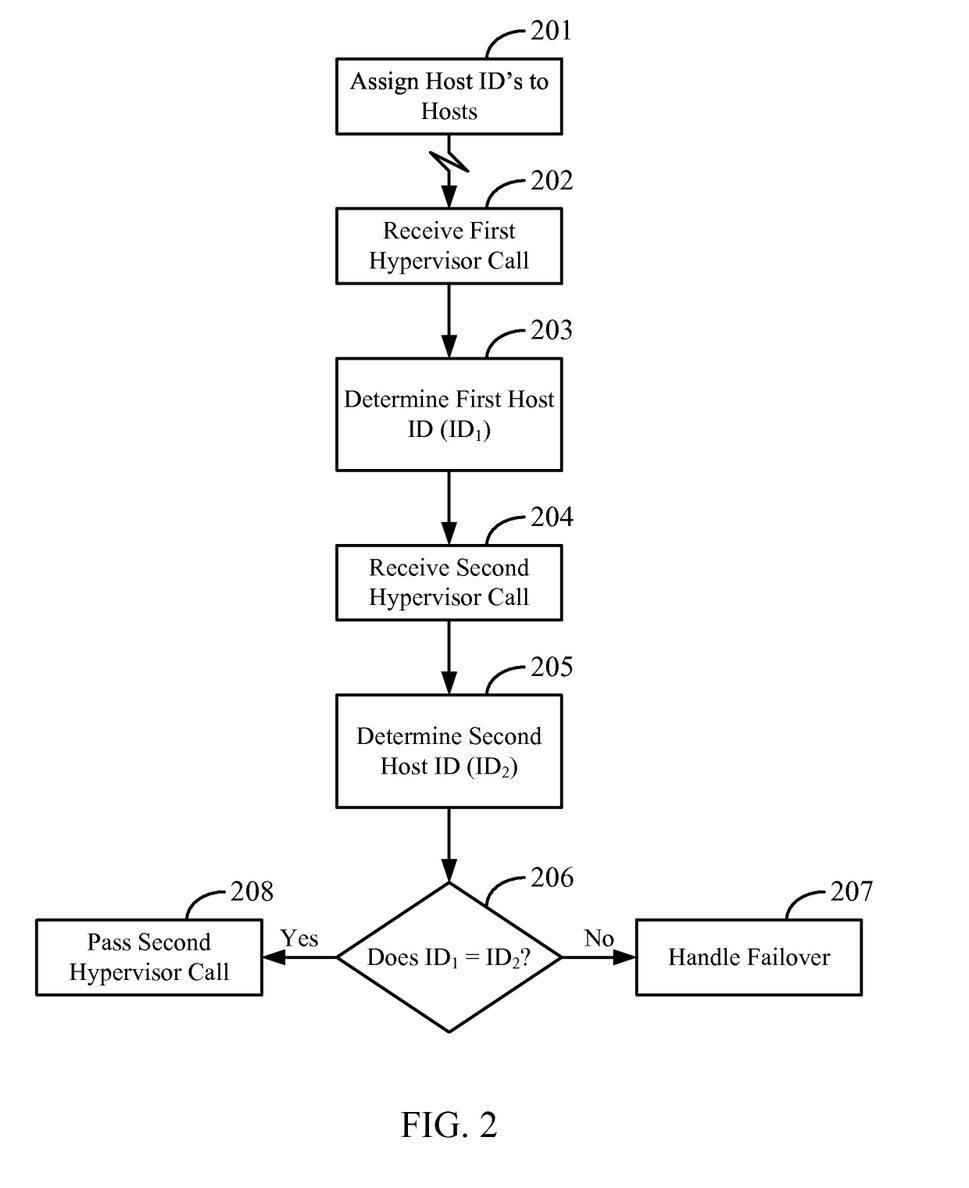
FIG. 2 is a diagram of a method for determining whether a failover has occurred between two hypervisor calls in a hypervisor call sequence, according to embodiments of the disclosure.

FIG. 2 is a diagram of a method for determining whether a failover has occurred in a high availability system, according to embodiments of the disclosure. Discussion of FIG. 2 may be used with a system such as that of FIG. 1. A system may determine whether more than one host has hosted a virtual machine 102 during a hypervisor call sequence. A host ID hypervisor interface 108 assigns a host ID to each of a plurality of hosts 101 in the system, as in 201. The host ID hypervisor interface 108 receives a first hypervisor call of a hypervisor call sequence from a virtual machine, as in 202. The host ID hypervisor interface 108 retrieves a first host ID identifying the host from which the first hypervisor call originates, as in 203, and stores the first host ID. The hypervisor interface 108 receives a second, subsequent hypervisor call of the hypervisor call sequence from the virtual machine, as in 204. The host ID hypervisor interface retrieves a second host ID identifying the host from which the second hypervisor call originates, as in 205. Logic in the system, whether in the host ID hypervisor interface 108 or the virtual machine 102, determines whether the second host ID is equal to the first host ID, as in 206, such as by comparing the second host ID to the first host ID. Based on the result of this determination, the system may pass the second hypervisor call to an operational hypervisor interface, as in 208, or handle the failover such as by restarting the hypervisor call sequence, as in 207.

Figure 3:
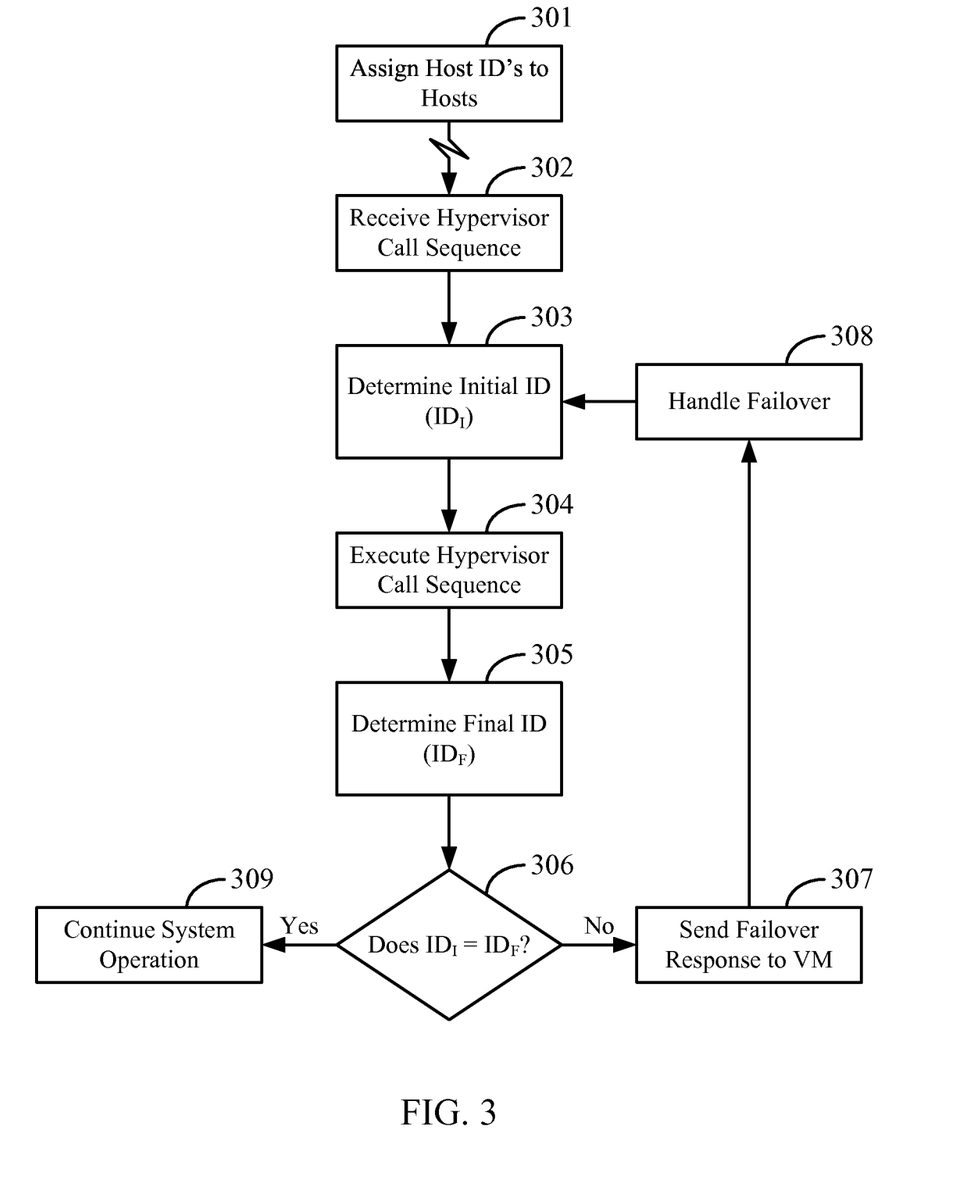
FIG. 3 is a diagram of a method for determining whether a failover has occurred during a hypervisor call sequence, according to embodiments of the disclosure.

FIG. 3 is a diagram of another method for determining whether a failover has occurred in a high availability system, according to embodiments of the disclosure. According to embodiments, a host ID is determined for the starting hypervisor call of the hypervisor call sequence and the ending hypervisor call in the call sequence. A host ID hypervisor interface 108 assigns and maintains a host ID for each of a plurality of hosts 101 in a system, as in 301. The assignment may be done when the hypervisor executes a virtual machine 102 on a host 101.

The host ID hypervisor interface 108 receives a hypervisor call sequence, as in 302. The host ID hypervisor interface 108 determines the host ID of the host 101 on which the virtual machine 102 is actively executing when the hypervisor call sequence is received, and maintains this host ID as an initial host ID ($ID_I$) for the hypervisor call sequence, as in 303. The system executes the hypervisor call sequence, as in 304. When the hypervisor call sequence has completed, the host ID hypervisor interface determines the host ID of the host 101 on which the virtual machine is actively executing when the hypervisor call sequence is completed, and maintains this host ID as a final host ID ($ID_F$) for the hypervisor call sequence, as in 305.

The host ID hypervisor interface 108 may determine whether the final host ID ($ID_F$) is equal to the initial host ID ($ID_I$), as in 306. Alternately, the virtual machine 102 may query the host ID hypervisor interface 108 for the initial host ID ($ID_I$) and the final host ID ($ID_F$) and determine whether the final host ID ($ID_F$) is equal to the initial host ID ($ID_I$). If the final host ID ($ID_F$) is equal to the initial host ID ($ID_I$), the system may continue operation, as in 309. If the final host ID ($ID_F$) is not equal to the initial host ID ($ID_I$), the host ID hypervisor interface 108 may send a failover response to the virtual machine 102, as in 307, or alternately, the virtual machine 102 may acknowledge that a failover has occurred. Additionally, the system may handle the failover, as in 308, such as by restarting the hypervisor call sequence, and the host ID hypervisor interface 108 may return to determining the initial host ID ($ID_I$), as in 303.

Figure 4:
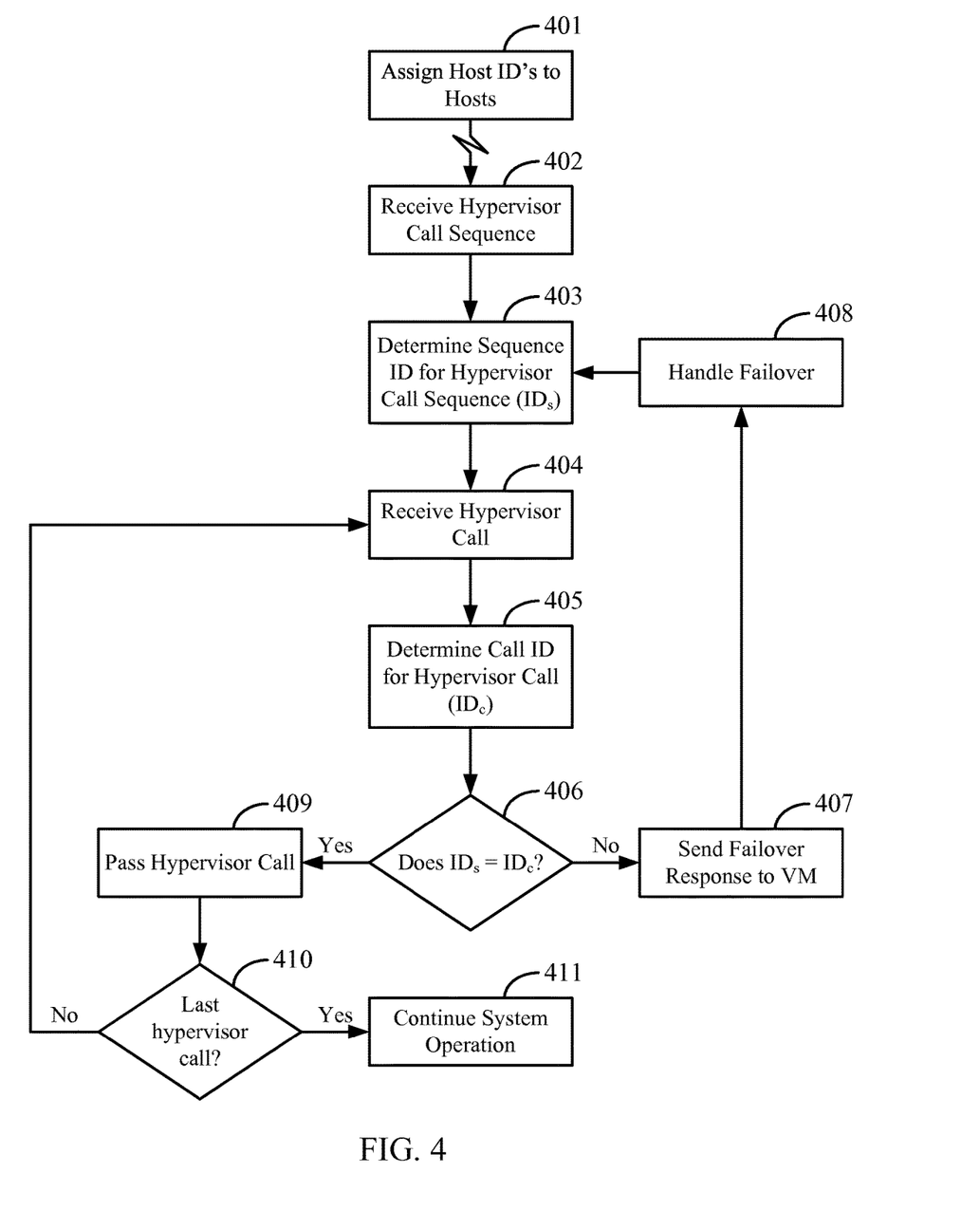
FIG. 4 is a diagram of a method for determining whether a failover has occurred during a call in a hypervisor call sequence, according to embodiments of the disclosure.

FIG. 4 is a diagram of another method for determining whether failover has occurred in a high availability system, according to embodiments of the disclosure. According to embodiments, a host ID is determined for the starting hypervisor call of the hypervisor call sequence and a subsequent call in the hypervisor call sequence. In certain embodiments, the host ID hypervisor interface can check each subsequent call with its immediately proceeding call.

In various embodiments, the host ID hypervisor interface can check less than each call. For instance, the host ID hypervisor interface could check every third call. A host ID hypervisor interface 108 assigns and maintains a host ID for each of a plurality of hosts 101 in the system, as in 401. The assignment may be done when a hypervisor 103 executes a virtual machine 102 on a primary host 101.

More specifically, the host ID hypervisor interface 108 receives a hypervisor call sequence, as in 402. The host ID hypervisor interface 108 determines the host ID of the host 101 on which the virtual machine 102 is actively executing when the hypervisor call sequence is received, and maintains this host ID as a sequence ID ($ID_S$), as in 403. The host ID hypervisor interface 108 receives a hypervisor call, as in 404. The host ID hypervisor interface 301 determines the host ID of the host 101 on which the virtual machine is executing when the hypervisor call is received, and maintains this host ID as a call ID ($ID_C$), as in 405.

The hypervisor interface may determine whether the call ID ($ID_C$) is equal to the sequence ID ($ID_S$), as in 406. If the call ID ($ID_C$) is not equal to the sequence ID ($ID_S$), the host ID hypervisor interface 108 may send a failover response to the virtual machine 102, as in 407. Additionally, the system may handle the failover, as in 408, such as by restarting the hypervisor call sequence. If the call ID ($ID_C$) is equal to the sequence ID ($ID_S$), the host ID hypervisor interface 108 may allow the hypervisor call to pass through, as in 409. The virtual machine 102 or host ID hypervisor interface 108 may evaluate whether the current hypervisor call is the last hypervisor call of the hypervisor call sequence, as in 410. If the current hypervisor call is not the last hypervisor call of the hypervisor call sequence, then the host ID hypervisor interface 108 may return to receiving a hypervisor call, as in 404. If the current hypervisor call is the last hypervisor call of the hypervisor call sequence, the host ID hypervisor interface 108 may continue system operation, as in 411.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be but is not limited to, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium including, but not limited to, wireless, wire line, optical fiber cable, RF, etc., or any suitable combination of the foregoing.

Computer program code for carrying out operations for aspects of the present disclosure may be written in any combination of one or more programming languages, including an object-oriented language such as Java, Smalltalk, C++, or the like, and conventional procedural programming languages, such as "C" programming language or similar programming languages. The program code may execute entirely on the user's computer, partly on the user's computer, as a standalone software package, partly on the user's computer and partly on a remote computer or server, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device to cause a series of operational steps to be performed on the computer, other programmable apparatus, or other device to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A method for treatment of a hypervisor call sequence having a plurality of hypervisor calls, in a system having a plurality of hosts, comprising:
   assigning a host identity (ID) to each host of a plurality of hosts in a system, each host of the plurality of hosts being a computer system comprising a processor, at least one hypervisor, and at least one virtual machine;
   identifying, by a host ID hypervisor interface, a first host ID for a host from which a first hypervisor call of a hypervisor call sequence originates, the hypervisor call sequence being a sequence of two or more hypervisor calls from a virtual machine to the hypervisor to perform an operation, the host ID hypervisor interface being in communication between the hypervisor and the virtual machine;
   identifying, by the host ID hypervisor interface, a second host ID identifying a host from which a second hypervisor call of the hypervisor call sequence originates, wherein the second hypervisor call is a call subsequent to the first hypervisor call;
   determining, by the host ID hypervisor interface, whether the second host ID is equal to the first host ID; and
   restarting the hypervisor call sequence in response to determining that the second host ID is not equal to the first host ID.

2. The method of claim 1, further comprising:
   passing, by the host ID hypervisor interface, the second hypervisor call to an operational hypervisor interface in response to determining that the second host ID is equal to the first host ID.

3. The method of claim 1, further comprising:
   sending a failover response to the virtual machine in response to determining that the second host ID is not equal to the first host ID.

4. The method of claim 1, wherein:
the first hypervisor call is a beginning hypervisor call of the hypervisor call sequence; and
the second hypervisor call is an ending hypervisor call of the hypervisor call sequence.

5. The method of claim 1, further comprising:
determining that there are subsequent hypervisor calls in the hypervisor call sequence in response to determining that the second host ID is equal to the first host ID;
receiving, by the host ID hypervisor interface, a third hypervisor call after determining that there are subsequent hypervisor calls in the hypervisor call sequence;
determining that there are not subsequent hypervisor calls in the hypervisor call sequence after receiving the third hypervisor call; and
completing the hypervisor call sequence in response to determining that there are not subsequent hypervisor calls in the hypervisor call sequence.

6. The method of claim 1, wherein the hypervisor call sequence has a starting index and a call counter to track the two or more hypervisor calls in the hypervisor call sequence.

7. The method of claim 1, wherein the operation performed by the hypervisor call sequence includes two or more actions, and wherein each hypervisor call of the two or more hypervisor calls in the hypervisor call sequence performs an individual action.

* * * * *